United States Patent
Honjo et al.

(10) Patent No.: US 9,602,727 B2
(45) Date of Patent: Mar. 21, 2017

(54) IMAGING APPARATUS AND IMAGING METHOD

(71) Applicant: Panasonic Intellectual Property Management Co., Ltd., Osaka (JP)

(72) Inventors: Kenichi Honjo, Osaka (JP); Yasuo Amano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/058,400

(22) Filed: Mar. 2, 2016

(65) Prior Publication Data

US 2016/0261806 A1 Sep. 8, 2016

(30) Foreign Application Priority Data

Mar. 6, 2015 (JP) .................................. 2015-044147
Jan. 25, 2016 (JP) .................................. 2016-011498

(51) Int. Cl.
*H04N 5/243* (2006.01)
*H04N 5/232* (2006.01)

(52) U.S. Cl.
CPC ..... *H04N 5/23287* (2013.01); *H04N 5/23209* (2013.01); *H04N 5/23258* (2013.01)

(58) Field of Classification Search
CPC ........... H04N 5/23209; H04N 5/23258; H04N 5/23287
See application file for complete search history.

(56) References Cited

U.S. PATENT DOCUMENTS

| 2005/0024504 A1* | 2/2005 | Hoshi | H04N 5/2178 348/231.3 |
| 2009/0016709 A1* | 1/2009 | Wen | G02B 7/36 396/127 |
| 2009/0219419 A1* | 9/2009 | Kawasaka | G03B 7/20 348/251 |
| 2009/0268075 A1* | 10/2009 | Yumiki | G03B 7/095 348/333.05 |
| 2010/0232032 A1* | 9/2010 | Sato | G02B 15/173 359/683 |
| 2013/0088639 A1* | 4/2013 | Mundt | H04N 5/2251 348/372 |
| 2014/0184839 A1* | 7/2014 | Kawamura | G02B 9/00 348/208.11 |

(Continued)

FOREIGN PATENT DOCUMENTS

JP 2009-251492 10/2009

*Primary Examiner* — Amy Hsu
(74) *Attorney, Agent, or Firm* — Wenderoth, Lind & Ponack, L.L.P.

(57) ABSTRACT

A digital camera includes an optical system composed of multiple lenses including an OIS lens for correcting image blur; and a CCD imaging an object image formed by the optical system. The digital camera includes an OIS actuator moving OIS lens in a plane vertical to the optical axis to correct image blur; and a CCD actuator moving the CCD in a plane vertical to the optical axis to correct image blur; and a camera controller. The camera controller corrects the image captured by the CCD and changes a correction level of peripheral brightness of the image captured by the CCD when correcting image blur is switched between by the OIS actuator and by the CCD actuator.

7 Claims, 14 Drawing Sheets

(56) References Cited

U.S. PATENT DOCUMENTS

| | | | |
|---|---|---|---|
| 2014/0247324 A1* | 9/2014 | Cury ..................... | H04N 7/183 348/36 |
| 2015/0097977 A1* | 4/2015 | Watanabe .......... | H04N 5/23258 348/208.2 |
| 2016/0091729 A1* | 3/2016 | Ollila ................ | H04N 5/23287 348/208.99 |

* cited by examiner

IMAGING APPARATUS AND IMAGING METHOD

BACKGROUND

1. Field

The present disclosure relates to an imaging apparatus having a blur correction function both on its lens and camera body, and to an imaging method.

2. Description of Related Art

There have been imaging apparatuses each having a sensing means (e.g., a gyro sensor) that senses its own shake. In the case of a lens-interchangeable camera, a sensing means (e.g., gyro sensor) for sensing shake of the imaging apparatus is provided on at least one of the interchangeable lens and the camera body. Such a conventional imaging apparatus is disclosed in Japanese Patent Unexamined Publication No. 2009-251492, for example. In the case of a sensing means provided in the interchangeable lens, the position of a blur-compensation lens provided inside the interchangeable lens is shifted according to results of sensing by the sensing means. Meanwhile, in the case of a sensing means provided in the camera body, the position of an imaging device (an image sensor) provided inside the camera body is shifted according to results of sensing by the sensing means.

With such an imaging apparatus, vibration in a frequency band of approximately 1 Hz to 10 Hz caused by shake of a user is sensed with a sensing means, and one or both of a lens inside the interchangeable lens and an imaging sensor inside the camera body are driven to reduce the influence of shake in captured images.

SUMMARY

The present disclosure relates to an imaging apparatus that reduces the influence of shake during photographing by shifting a correcting lens or imaging device. An object of the disclosure is to prevent captured images from degrading due to an object image projected on an imaging device having lower brightness closer to the periphery of the imaging device, and provide favorable images. Another object is to provide an imaging method using the imaging apparatus.

An imaging apparatus of the disclosure includes an optical system, a lens actuator, an imaging device, a device actuator, and a control unit. The optical system is composed of multiple lenses including a correcting lens for correcting image blur. The lens actuator moves the correcting lens in a plane vertical to the optical axis to correct image blur. The imaging device captures the image of an object formed by the optical system. The device actuator moves the imaging device in a plane vertical to the optical axis to correct image blur. The control unit corrects an image captured by the imaging device, and changes a correction level of peripheral brightness of the image captured by the imaging device when correcting image blur is switched between by the lens actuator and by the device actuator.

An imaging method of the disclosure includes a step of capturing an image, a first image blur correcting step, a second image blur correcting step, and a step of correcting the image. The step of capturing the image captures the image of an object formed by the optical system including a correcting lens, within an imaging device. The first image blur correcting step moves the correcting lens in a plane vertical to the optical axis to correct image blur. The second image blur correction step moves the imaging device in a plane vertical to the optical axis to correct image blur. The step of correcting the image corrects the image captured by the imaging device, and changes a correction level of peripheral brightness of the image when image blur correcting is switched between by the first image blur correcting step and by the second image blur correcting step.

DETAILED DESCRIPTION

Hereinafter, a detailed description is made of some exemplary embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure and are not intended to limit the subjects described in the claims. Hereinafter, a description is made using a digital camera as an example of an imaging apparatus.

First Exemplary Embodiment

A digital camera of the embodiment has a blur correction function (a function for correcting image blur) that reduces the influence of camera shake on a captured image in both the interchangeable lens and the camera body. Hereinafter, a detailed description is made of the configuration and operation of a camera according to the embodiment.

In the following description, the function of correcting camera blur by shifting the correcting lens inside the interchangeable lens is referred to as the OIS (optical image stabilizer) function. The function of correcting camera blur by shifting the imaging device inside the camera body is referred to as the BIS (body image stabilizer) function. With digital camera 1 according to the embodiment, the OIS function is assumed to correct with a degree of accuracy higher than the BIS function.

1. Configuration

Figure 1:
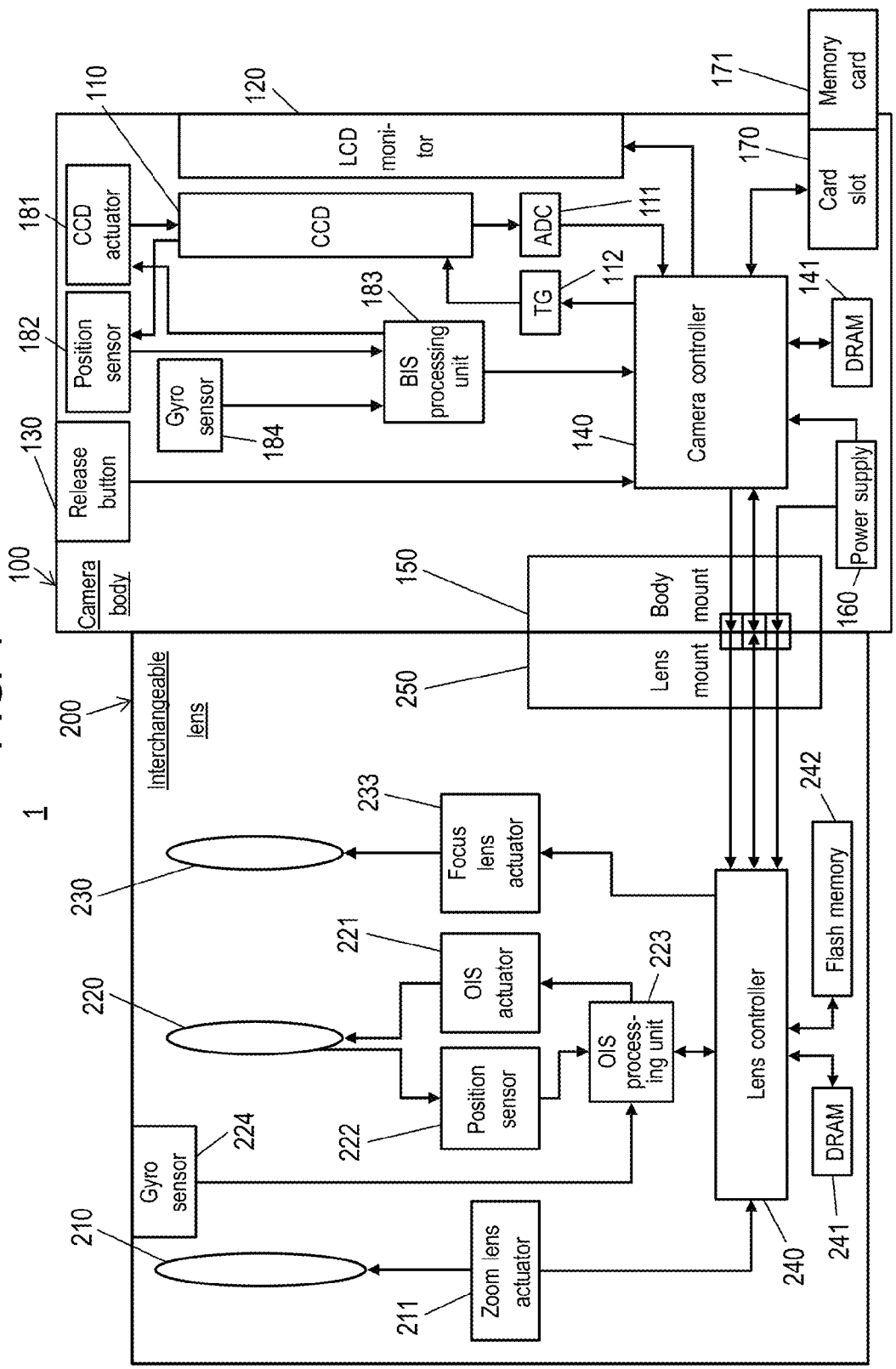
FIG. 1 is a block diagram illustrating the configuration of a digital camera according to the first exemplary embodiment.

FIG. 1 is a block diagram illustrating the configuration of digital camera 1 according to the first exemplary embodiment of the present invention. Digital camera 1 includes body 100 and interchangeable lens 200 attachable to and detachable from camera body 100.

1-1. Camera Body

Camera body 100 includes CCD (charge-coupled device) 110, LCD monitor 120, camera controller 140, body mount 150, power supply 160, and card slot 170.

Camera controller 140 controls some components such as CCD 110 according to directions from release button 130 to control the entire operation of digital camera 1. Camera controller 140 transmits a vertical synchronizing signal to timing generator (TG) 112. Concurrently, camera controller 140 generates an exposure synchronizing signal. Camera controller 140 periodically transmits the generated exposure synchronizing signal to lens controller 240 through body mount 150 and lens mount 250. Camera controller 140 uses DRAM 141 as a working memory to perform control operation and image processing operation.

CCD 110 captures an object image entering through interchangeable lens 200 to generate image data. The image data generated is digitized by AD converter (ADC) 111. The image data digitized undergoes given image processing by camera controller 140. Examples of given image processing include gamma correction, white balance correction, scratch correction, YC conversion, electronic zooming, and JPEG compression.

CCD 110 operates with timing controlled by timing generator 112. Examples of operation of CCD 110 include capturing a still image and capturing a through-the-lens image. A through-the-lens image is typically a moving image and is displayed on LCD monitor 120 for a user to determine a composition for capturing a still image.

LCD monitor 120 displays an image represented by display image data image-processed by camera controller 140. LCD monitor 120 is capable of selectively displaying a moving image and a still image.

Card slot 170, into which memory card 171 can be inserted, controls memory card 171 according to control from camera controller 140. Digital camera 1 is capable of storing image data into memory card 171 and of reading image data from memory card 171.

Power supply 160 supplies power to the respective components inside digital camera 1.

Body mount 150 is connectable with lens mount 250 of interchangeable lens 200 mechanically and electrically. Camera body 100 and interchangeable lens 200 are capable of transmitting and receiving data through a connector between body mount 150 and lens mount 250. Body mount 150 transmits an exposure synchronizing signal received from camera controller 140 to lens controller 240 through lens mount 250. Body mount 150 transmits the other signals received from camera controller 140 to lens controller 240 through lens mount 250. Body mount 150 transmits a signal received from lens controller 240 through lens mount 250 to camera controller 140. Further, body mount 150 supplies power from power supply 160 to entire interchangeable lens 200 through lens mount 250.

Camera body 100, to achieve the BIS function (blur correction by shifting CCD 110), further includes gyro sensor 184 sensing shake of camera body 100, and BIS processing unit 183 controlling the blur correction processing based on results of detecting by gyro sensor 184. Camera body 100 further includes CCD actuator 181 moving CCD 110, and position sensor 182 sensing the position of CCD 110. CCD actuator 181 can be made of a magnet and a plain-plate coil for example. Position sensor 182 senses the position of CCD 110 in a plane vertical to the optical axis of the optical system. Position sensor 182 can be made of a magnet and a Hall effect sensor for example. BIS processing unit 183 controls CCD actuator 181 based on a signal from gyro sensor 184 and a signal from position sensor 182, to shift CCD 110 in a plane vertical to the optical axis so as to compensate blur of camera body 100.

Here, a CCD is used for an imaging sensor included in camera body 100; another imaging sensor such as a CMOS (complementary metal oxide semiconductor) sensor may be used. For CCD actuator 181, another actuator may be used, such as a stepping motor and an ultrasonic motor. A stepping motor for the actuator allows open control, which may accordingly eliminates the need for a position sensor.

1-2. Interchangeable Lens

Interchangeable lens 200 includes an optical system, lens controller 240, and lens mount 250. The optical system includes zoom lens 210, OIS lens 220, and focus lens 230. Interchangeable lens 200 further includes DRAM 141 and flash memory 242.

Zoom lens 210 changes the magnification of an object image formed by the optical system. Zoom lens 210 includes one or more lenses. Zoom lens actuator 211, including a zoom ring operable by a user for instance, transmits operation by the user to zoom lens 210 to move zoom lens 210 along the direction of the optical axis of the optical system.

Focus lens 230 changes the state of focusing an object image formed on CCD 110 by the optical system. Focus lens 230 includes one or more lenses.

Focus lens actuator 233, including a motor, moves focus lens 230 along the direction of the optical axis of the optical system based on control by lens controller 240. Focus lens actuator 233 can be made of a DC motor, stepping motor, servomotor, or ultrasonic motor, for example.

OIS lens 220, in the OIS function (blur correction by shifting OIS lens 220), corrects blur of an object image formed by the optical system of interchangeable lens 200. OIS lens 220 moves in a direction that compensates blur of digital camera 1 to reduce blur of an object image on CCD 110. OIS lens 220 includes one or more lenses. OIS actuator 221 shifts OIS lens 220 in a plane vertical to the optical axis of the optical system responding to control from OIS processing unit 223.

OIS actuator 221 can be made of a magnet and a plain-plate coil for example. Position sensor 222 senses the position of OIS lens 220 in a plane vertical to the optical axis of the optical system. Position sensor 222 can be made of a magnet and a Hall effect sensor for example. OIS processing unit 223 controls OIS actuator 221 based on output from position sensor 222 and from gyro sensor 224 (a shake detector). Here, an ultrasonic motor or another actuator may be used for OIS actuator 221.

Gyro sensor 184 or 224 senses shake (vibration) in a yawing direction and in a pitching direction based on an angular velocity (i.e., the rate of change of angular displacement per a unit time) of digital camera 1. Gyro sensor 184 or 224 outputs an angular velocity signal, which indicates the amount (angular velocity) of shake sensed, to OIS processing unit 223 or BIS processing unit 183. The angular velocity signal output from gyro sensor 184 or 224 can contain a wide range of frequency components resulting from camera shake and from mechanical noise for example. In this embodiment, a gyro sensor is used for a means for sensing angular velocity; instead, another sensor can be used as long as it can sense shake of digital camera 1.

Camera controller 140 and lens controller 240 may be either a hard-wired electronic circuit or a programmed microprocessor.

1-3. OIS Processing Unit

Figure 2:
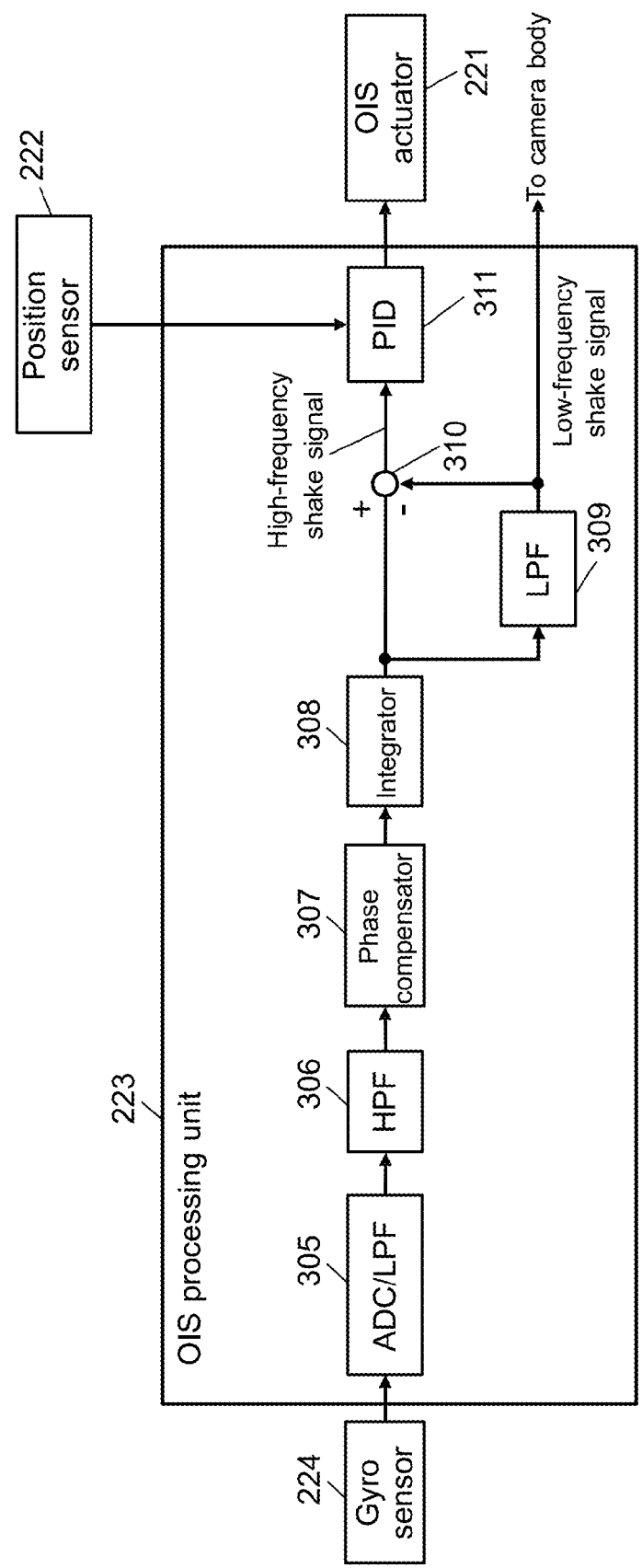
FIG. 2 is a block diagram illustrating the configuration of the OIS (optical image stabilizer) processing unit of the digital camera of the first embodiment.

A description is made of the configuration of OIS processing unit 223 in interchangeable lens 200 using FIG. 2. OIS processing unit 223 includes ADC (analog-to-digital converter)/LPF (low-pass filter) 305, HPF (high-pass filter) 306, phase compensator 307, integrator 308, LPF 309, adder 310, and PID (proportional integral derivative) control unit 311.

ADC/LPF 305 converts an angular velocity signal transmitted from gyro sensor 224 from an analog format to a digital format. Further, to remove noise and to extract only shake of digital camera 1, ADC/LPF 305 cuts off high-frequency components of the angular velocity signal converted to a digital format. Shake of a user at a low frequency of approximately 1 Hz to 10 Hz; the cutoff frequency of the LPF is determined taking this point in consideration. If noise does not cause a problem, the function of an LPF can be omitted.

To cut off a drift component, HPF 306 cuts off components of given low frequencies contained in a signal received from ADC/LPF 305. Phase compensator 307 corrects phase delays resulting from OIS actuator 221 and from communications (to be described later) between the lens and body, for example, for a signal received from HPF 306.

Integrator 308 integrates a signal indicating an angular velocity of shake (vibration) input from phase compensator 307 and generates a signal indicating the angle of shake (vibration). Hereinafter, a signal generated by integrator 308 is referred to as a shake detection signal.

A shake detection signal from integrator 308 is input to LPF 309 and adder 310. LPF 309 cuts off high-frequency components of the shake detection signal and passes low-frequency components (hereinafter, referred to as a low-frequency shake signal). A low-frequency shake signal indicates the amount of correcting blurring in the low-frequency region. The cutoff frequency of LPF 309 is determined taking the frequency of shake (1 Hz to 10 Hz) in consideration. Here, an LPF is used for generating a low-frequency shake signal; any filter may be used as long as it cuts off high-frequency components, such as an LSF (low-shelf filter). Meanwhile, the filter configuration is not limited to this one; another configuration may be used, for example a configuration in which HPF 306 and integrator 308 are interchanged in their positional order.

Adder 310 subtracts low-frequency components extracted by LPF 309; from a shake detection signal input from integrator 308, to extract high-frequency components (hereinafter, referred to as a high-frequency shake signal) of the shake detection signal. A high-frequency shake signal indicates the amount of correcting blurring in the high-frequency region. A high-frequency shake signal is input to PID control unit 311. Meanwhile, a low-frequency shake signal is transmitted to camera body 100.

PID control unit 311 performs PID control based on the difference between a high-frequency shake signal having been input and the present positional information of OIS lens 220 received from position sensor 222; generates a drive signal for OIS actuator 221; and sends the signal to OIS actuator 221. OIS actuator 221 drives OIS lens 220 based on the drive signal.

1-4. BIS Processing Unit

Figure 3:
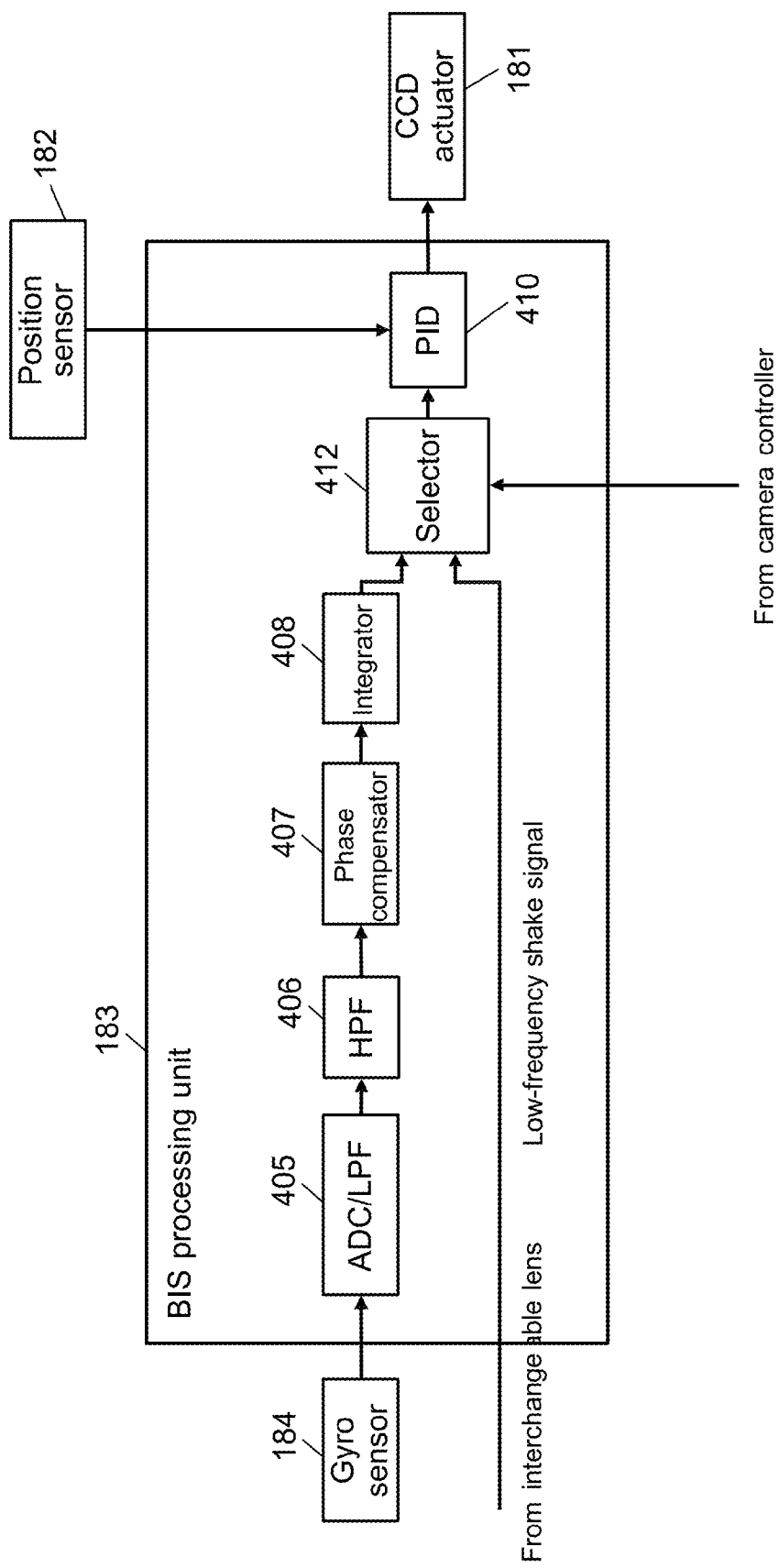
FIG. 3 is a block diagram illustrating the configuration of the BIS (body image stabilizer) processing unit of the digital camera of the first embodiment.

A description is made of the configuration of BIS processing unit 183 in camera body 100 using FIG. 3. BIS processing unit 183 includes ADC (analog-to-digital converter)/LPF (low-pass filter) 405, HPF (high-pass filter) 406, phase compensator 407, integrator 408, selector 412, and PID control unit 410.

The basic functions of ADC/LPF405, HPF 406, phase compensator 407, integrator 408, and PID control unit 410 are the same as the corresponding components of OIS processing unit 223.

BIS processing unit 183 is configured to perform blur correction processing especially based on either one of output from gyro sensor 184 (integrator 408); or a low-frequency shake signal received from interchangeable lens 200. For this purpose, BIS processing unit 183 has selector 412 that selectively outputs either one of output from gyro sensor 184 (integrator 408); or a low-frequency shake signal received from interchangeable lens 200, to PID control unit 410. To perform the blur correction function by camera body 100 (e.g., an interchangeable lens without an blur correction function), selector 412 selects output from gyro sensor 184 (integrator 408). Selector 412 is controlled by camera controller 140.

PID control unit 410 generates a drive signal for shifting CCD 110 based on output from position sensor 182; and output from integrator 408 or a low-frequency shake signal from interchangeable lens 200, and outputs the drive signal to CCD actuator 181. CCD actuator 181 drives CCD 110 based on the drive signal.

2. Operation 2-1. Blur Correction Processing

A description is made of the blur correction processing in digital camera 1 configured as above. In the following, a description is made of an example of driving OIS lens 220 and CCD 110 based on a signal from gyro sensor 224, which is provided at the lens, of the two gyro sensors 224 and 184. That is, digital camera 1 uses gyro sensor 224, which is provided at the lens. At this moment, selector 412 inside BIS processing unit 183 is controlled to select a low-frequency shake signal and to output it to PID control unit 410. At this moment, digital camera 1 operates with interchangeable lens 200 including gyro sensor 224 to be used as a master device, and with camera body 100 (the other side) as a slave device.

OIS processing unit 223 receives a detection signal from gyro sensor 224 and generates a shake detection signal from the detection signal received, and then separates the shake detection signal into a high-frequency shake signal and a low-frequency shake signal. OIS processing unit 223 generates a drive signal for shifting OIS lens 220 based on the high-frequency shake signal and on the positional information from position sensor 222, and outputs the drive signal to OIS actuator 221. OIS actuator 221 shifts OIS lens 220 on a plane vertical to the optical axis so as to cancel high-frequency shake sensed by gyro sensor 224 following the drive signal from OIS processing unit 223.

The low-frequency shake signal generated by OIS processing unit 223 is transmitted to camera body 100 using communications between the interchangeable lens and the camera body through lens mount 250 and body mount 150. At this moment, selector 412 in BIS processing unit 183 of camera body 100 is controlled to select the low-frequency shake signal from interchangeable lens 200. BIS processing unit 183 generates a drive signal for driving CCD 110 based on the low-frequency shake signal from interchangeable lens 200 and on the positional information from position sensor 182, and transmits the drive signal to CCD actuator 181. CCD actuator 181 shifts CCD 110 on a plane vertical to the optical axis so as to cancel low-frequency shake sensed by gyro sensor 224 following the drive signal from BIS processing unit 183. Here, the communications between the interchangeable lens and the camera body are performed through lens mount 250 and body mount 150; optical communications or wireless communications may be used.

As described above, digital camera 1 of the embodiment activates the blur correction function at interchangeable lens 200 based on high-frequency components in the shake signal sensed, and activates the blur correction function at camera body 100 based on low-frequency components in the shake signal sensed. As a result that this embodiment thus divides the blur correction function with camera body 100 and interchangeable lens 200, it is only required that interchangeable lens 200 corrects only high-frequency shake. This allows the range of correction by OIS lens 220 to be used effectively.

In this embodiment, the side of interchangeable lens 200 is used as a master device; instead, the side of camera body 100 may be used. That is, the OIS and BIS functions may be controlled based on output from gyro sensor 184 of camera body 100. In this case, as shown in FIG. 2, BIS processing unit 183 is preferably configured to separate a shake signal based on a detection signal from gyro sensor 184 into low-frequency and high-frequency shake signals. The low-frequency shake signal is transmitted from camera body 100 to interchangeable lens 200, and driving of OIS lens 220 is controlled based on the low-frequency shake signal at the side of interchangeable lens 200. Meanwhile, driving of CCD 110 is controlled based on the high-frequency shake signal at the side of camera body 100. This allows the range of correction by BIS at the side of camera body 100 to be used effectively.

Consequently, the following control is appropriate. That is, one correction function where one of interchangeable lens 200 and camera body 100 is used as a master device is controlled based on a high-frequency shake signal; the other correction function is controlled based on a low-frequency shake signal.

Here, a master device is preferably chosen from camera body 100 and interchangeable lens 200 based on the accuracy in blur correction by the OIS or BIS function. With digital camera 1 according to the embodiment, the OIS function performs blur correction more accurately than the BIS function, and thus the side of interchangeable lens 200 is determined as a master device. Such a configuration allows the two types of blur correction functions to be used efficiently. With digital camera 1 according to the embodiment, the OIS function capable of highly accurate correction corrects high-frequency components of a shake detection signal, while the BIS function with an accuracy lower than the OIS corrects low-frequency components of the shake detection signal. For this reason, digital camera 1 is configured to actively transmit low-frequency components of the shake detection signal from the master device.

2-2. Basic Principle of Peripheral Brightness Correction

As described above, digital camera 1 of this embodiment, including interchangeable lens 200 and camera body 100, operates with the OIS function at interchangeable lens 200 and the BIS function at camera body 100 in a coordinated fashion to correct image blur. Hereinafter, a description is made of the basic principle of peripheral brightness correction in such digital camera 1.

Figure 4:
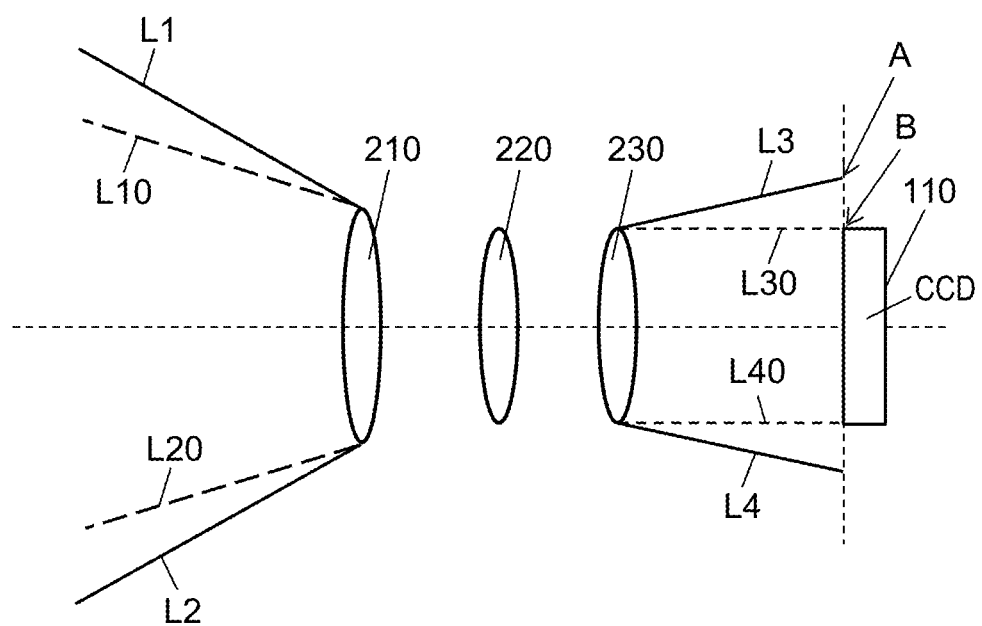
FIG. 4 illustrates the principle of peripheral brightness reduction in the digital camera of the first embodiment.

FIG. 4 illustrates the principle of peripheral brightness reduction in a digital camera of this embodiment. The optical system includes zoom lens 210, OIS lens 220, and focus lens 230. The imaging device includes CCD 110. OIS lens 220 is shifted in a direction vertical to the optical axis to provide a blur correction function. Here, an example is shown where OIS lens 220 is retained in the center. FIG. 4 shows boundaries L1 and L2 of the range of light beams within which an object image can be captured. The range from L1 to L2 corresponds to the range from L3 to L4 at CCD 110. Meanwhile, FIG. 4 shows boundaries L30 and L40 of the range within which an object image can be captured by CCD 110. The range from L30 to L40 within which an object image can be captured by CCD 110 corresponds to the range from L10 to L20 at the object side (the left side of zoom lens 210). Point A in the figure indicates the intersection point of the extended line from the surface of CCD 110 and range L3. Point B in the figure indicates the intersection point of the end point of CCD 110 and range L30. A detailed description is made of these intersection points A and B using FIG. 5.

With a typical optical system, its imaging device has lower brightness closer to the periphery of the imaging device. Specifically, in FIG. 4, the brightness gradually decreases from the center of the optical axis (indicated by a dash-dot line) in the upward vertical direction, from L30 toward L3 along CCD 110; and from the center of the optical axis (indicated by a dash-dot line) in the downward vertical direction, from L40 toward L4 along CCD 110.

Figure 5:
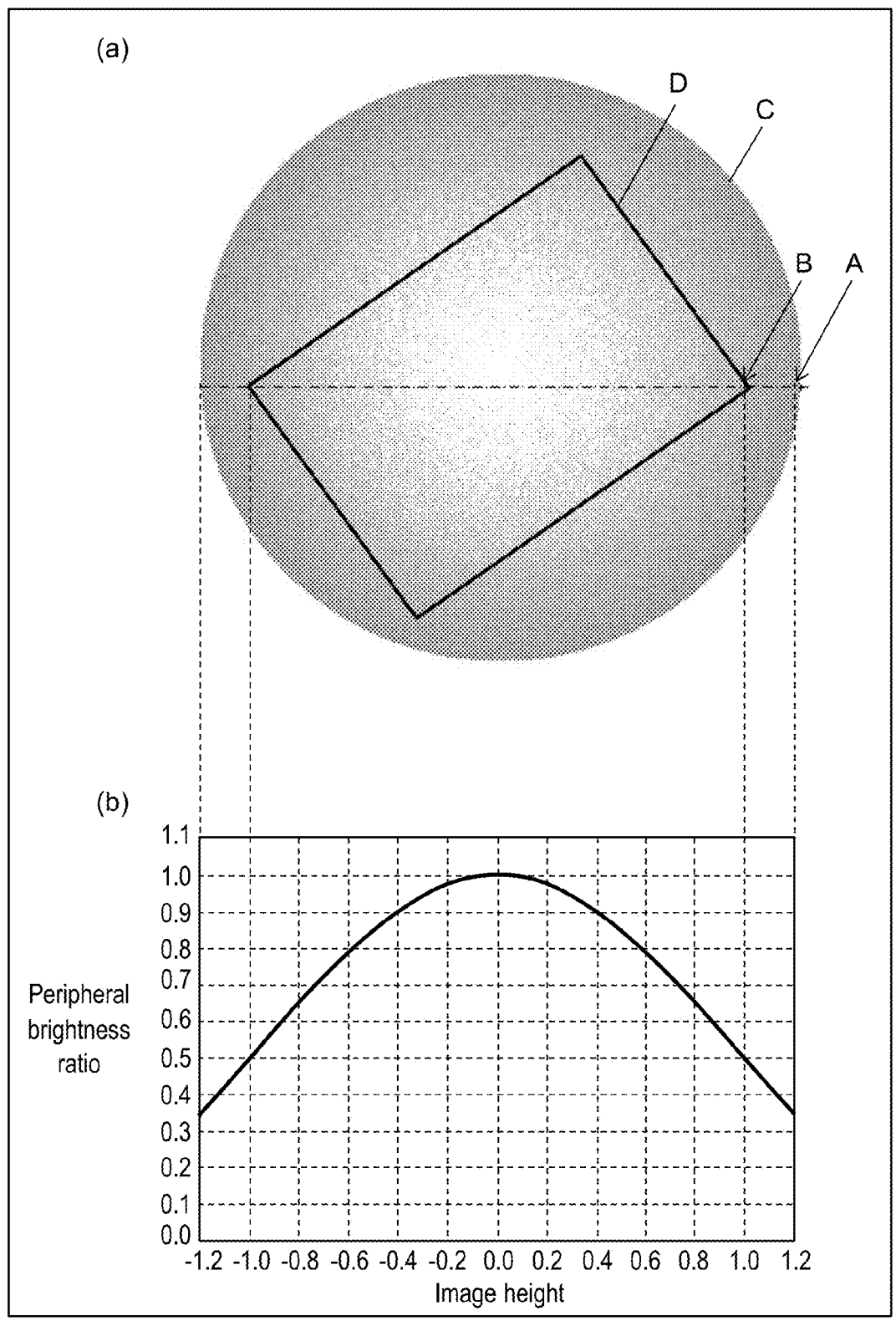
FIG. 5 illustrates the principle of peripheral brightness reduction and a characteristic graph of peripheral brightness reduction in the digital camera of the first embodiment.

FIG. 5 illustrates the principle of peripheral brightness reduction and a characteristic graph of peripheral brightness reduction. FIG. 5A illustrates brightness distribution C of an object image at the side of CCD 110 through zoom lens 210, OIS lens 220, and focus lens 230, as well as outer shape D of CCD 110. Brightness distribution C of an object image at the side of CCD 110 is referred to as an effective image circle. The outside of the circle does not receive an appropriate amount of light beams, what is called vignetting. Point A, where the dash-dot line crosses the outer shape of brightness distribution C, corresponds to intersection point A in FIG. 4 described hereinbefore. Point B, where the dash-dot line crosses outer shape D of CCD 110, corresponds to intersection point B in FIG. 4 described hereinbefore.

In FIG. 5B, the horizontal axis represents an image height and corresponds to the coordinate along the dash-dot line of FIG. 5A. The vertical axis represents a peripheral brightness ratio, which exhibits characteristics in which the peripheral brightness decreases as the image height along the dash-dot line of FIG. 5A increases, where the image height is 0 at the center of brightness distribution C of FIG. 5A and the peripheral brightness ratio is 1.0. Here, the image height is 1.0 at point B, where the dash-dot line of FIG. 5A crosses outer shape D of CCD 110. Outside intersection point A (a region where the image height exceeds 1.2), vignetting occurs and an appropriate amount of light beams are not received, and thus the region is omitted in the characteristic graph of FIG. 5B. As a specific example, the characteristic graph of peripheral brightness reduction of FIG. 5B indicates a peripheral brightness ratio of 0.5 for an image height of 1.0; and a peripheral brightness ratio of 0.35 for an image height of 1.2. The characteristic graph of peripheral brightness reduction has a shape of bilateral symmetry with respect to the point where the image height is 0. The graph shows the characteristics to the image height=−1.2, where the coordinate on the left side of the image height=0 represents negative values.

Figure 6A:
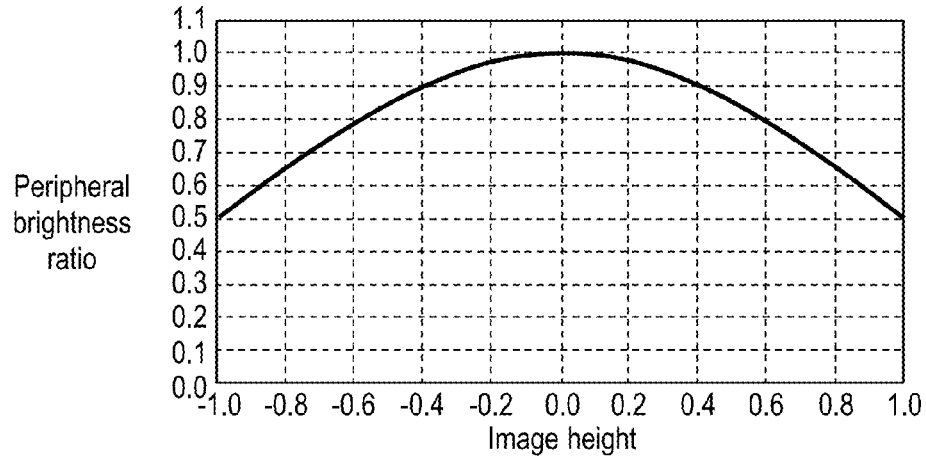
FIG. 6A is a characteristic graph of peripheral brightness reduction in the digital camera of the first embodiment.
Figure 6B:
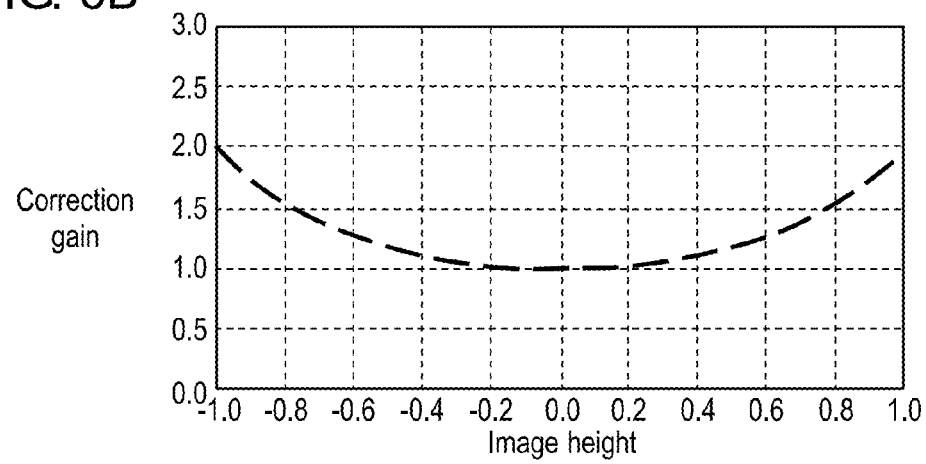
FIG. 6B is a characteristic graph of correction gain for peripheral brightness in the digital camera of the first embodiment.
Figure 6C:
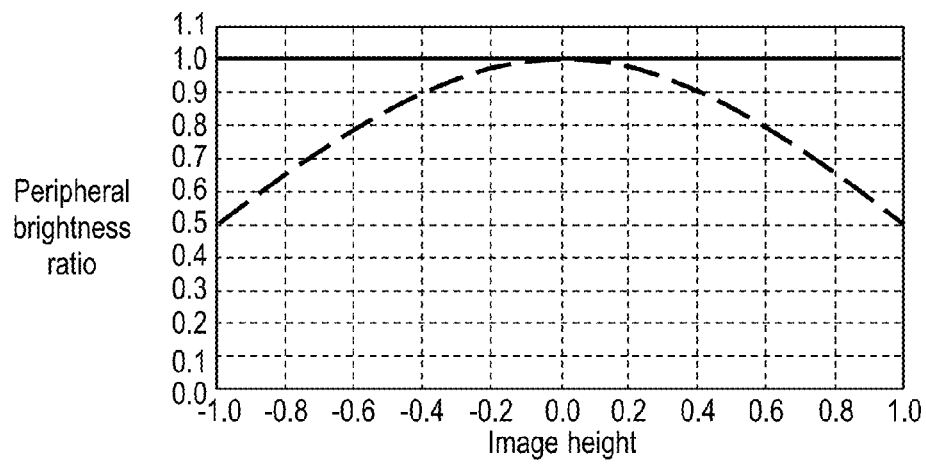
FIG. 6C is a characteristic graph of corrected peripheral brightness.

Next, a specific example is shown where peripheral brightness is corrected, using FIGS. 6A through 6C. FIG. 6A is a characteristic graph of peripheral brightness reduction. FIG. 6B is a characteristic graph of correction gain for peripheral brightness. FIG. 6C is a characteristic graph of corrected peripheral brightness. FIG. 6A is the same as the characteristic graph of peripheral brightness reduction of FIG. 5B described before. However, the graph is drawn only for light beams projected onto CCD 110, and thus the image height on the horizontal axis is limited to −1.0 through 1.0. FIG. 6B is a characteristic graph of correction gain for peripheral brightness in a case where peripheral brightness correction is made according to the characteristics of peripheral brightness reduction of FIG. 6A. The peripheral brightness is corrected by increasing the gain of image data input to camera controller 140 through CCD 110 and ADC 111 in camera controller 140 shown in FIG. 1. FIG. 6C shows an example where the peripheral brightness ratio can be corrected to 1.0 independently of an image height by multiplying the characteristics of peripheral brightness reduction of FIG. 6A by the characteristics of peripheral brightness correction gain of FIG. 6B for each image height. In FIG. 6C, the characteristic graph (same as the characteristic graph of FIG. 6A) indicated by the broken line changes by correction to the characteristic graph after peripheral brightness correction indicated by the solid line.

2-3. Principle of Peripheral Brightness Correction in Blur Correction System

An object image projected on CCD 110 has further lower brightness closer to the periphery of CCD 110 by shifting the correcting lens (hereinafter, referred to as an OIS lens) and by shifting the imaging device (hereinafter, referred to as a CCD). Here, a description is made of a specific embodiment for solving the problem that an image captured in this way is degraded.

2-3-1. Principle of Peripheral Brightness Characteristics by Shifting OIS Lens

Figure 7A:
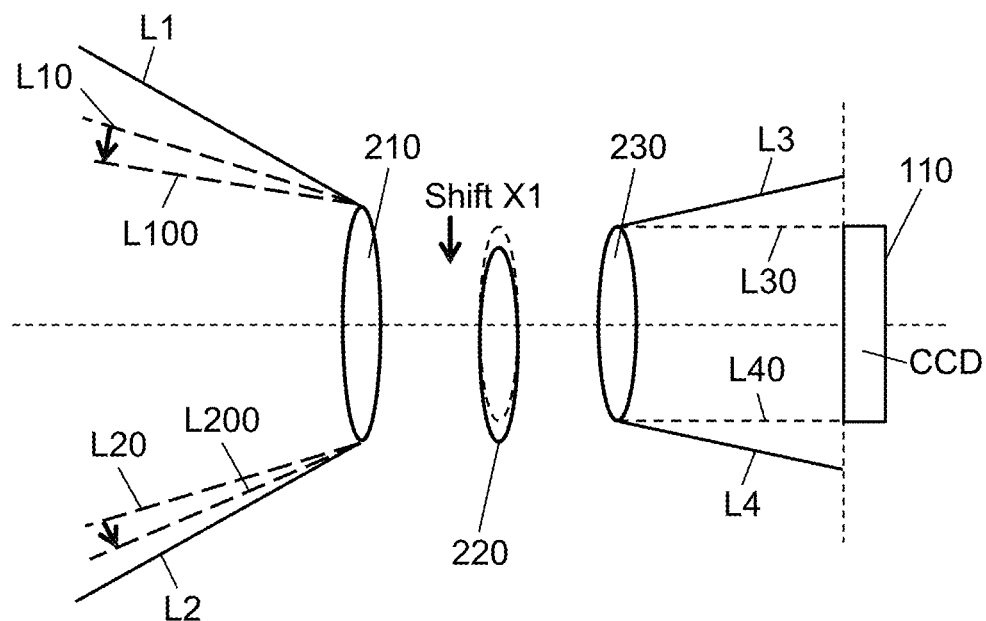
FIG. 7A illustrates the principle of the peripheral brightness characteristics when the OIS lens of the digital camera of the first embodiment is shifted.
Figure 7B:
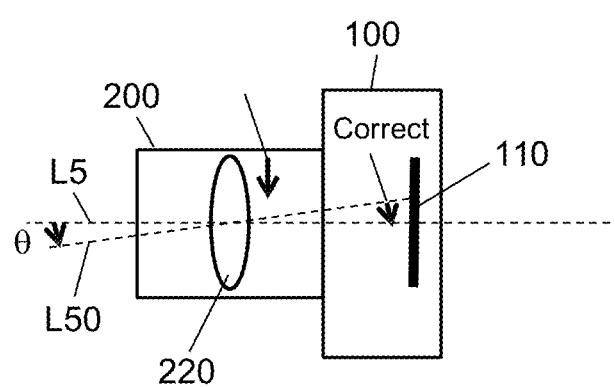
FIG. 7B illustrates the principle of blur correction by shifting the OIS lens of the digital camera of the first embodiment.

FIG. 7A illustrates the principle of the peripheral brightness characteristics by shifting the OIS lens. FIG. 7B illustrates the principle of blur correction by shifting the OIS lens. FIG. 7B showsdigital camera 1 including CCD 110 in camera body 100 and OIS lens 220 in interchangeable lens 200. In FIG. 7B, only the elements needed to explain the point are shown. Assuming that digital camera 1 has rotated by angle θ with respect to optical axis L5 around OIS lens 220 due to shake, optical axis L5 rotates to optical axis L50, which is optical axis L5 rotated by angle θ around OIS lens 220. In this case, by shifting OIS lens 220 by shift amount X1 according to angle θ, which is an angle to which digital camera 1 has rotated by shake, correction is made so that rotated optical axis L50 agrees with optical axis L5 at the right side of OIS lens 220. Resultingly, even if digital camera 1 rotates by shake, an object image can be formed on CCD 110 without blur. As an example, assuming that focal length f of interchangeable lens 200 is 150 mm and angle θ by which digital camera 1 has rotated due to shake is 0.3 degree, when axis L5 rotates to optical axis L50 on CCD 110, the position of the formed image deviates by approximately 0.78 mm. This deviation can be corrected by shifting OIS lens 220. The shift amount of OIS lens 220 depends on optical design. For example, blur correction function can be realized with the shift amount X1 of 0.3 mm by making this shift recover the amount of the deviation, 0.78 mm, of the position of the formed image.

In FIG. 7A, OIS lens 220 shifted in the direction vertical to the optical axis provides a blur correction function. First, a description is made of a case where OIS lens 220 is retained in the center. FIG. 7A shows boundaries L1 and L2 of the range of light beams within which an object image can be captured in a case where OIS lens 220 is retained in the center. The range of light beams from L1 to L2 corresponds to the range of light beams from L3 to L4 at the side of CCD 110. Meanwhile, FIG. 7A shows boundaries L30 and L40 of the range within which an object image can be captured by CCD 110. The range from L30 to L40 corresponds to the range from L10 to L20 at the side of an object (the left side of zoom lens 210). Here, as described using FIG. 7B, if digital camera 1 rotates by angle θ around OIS lens 220 due to shake, shifting OIS lens 220 by shift amount X1 in the direction vertical to the optical axis allows the deviation of the position of an formed image on CCD 110 due to shake to be corrected. At this moment, the range from L10 to L20 at the side of an object (the left side of zoom lens 210), corresponding to the range from L30 to L40 projected on CCD 110, moves to the range from L100 to L200. In this way, the blur correction by shifting OIS lens 220 causes the range at the side of an object to shift, which then causes boundary L20 of the range to move to boundary L200 of the range and to approach boundary L2 of the range within which an object can be captured, which then causes the amount of light beam L30 corresponding to the side of CCD 110 to slightly decrease. Meanwhile, boundary L10 of the range moves to boundary L100 of the range and moves away from boundary L1 of the range within which an object can be captured, which causes the amount of light beam L40 corresponding to the side of CCD 110 to slightly increase.

2-3-2. Principle of Peripheral Brightness Characteristics by CCD Shift

Figure 8A:
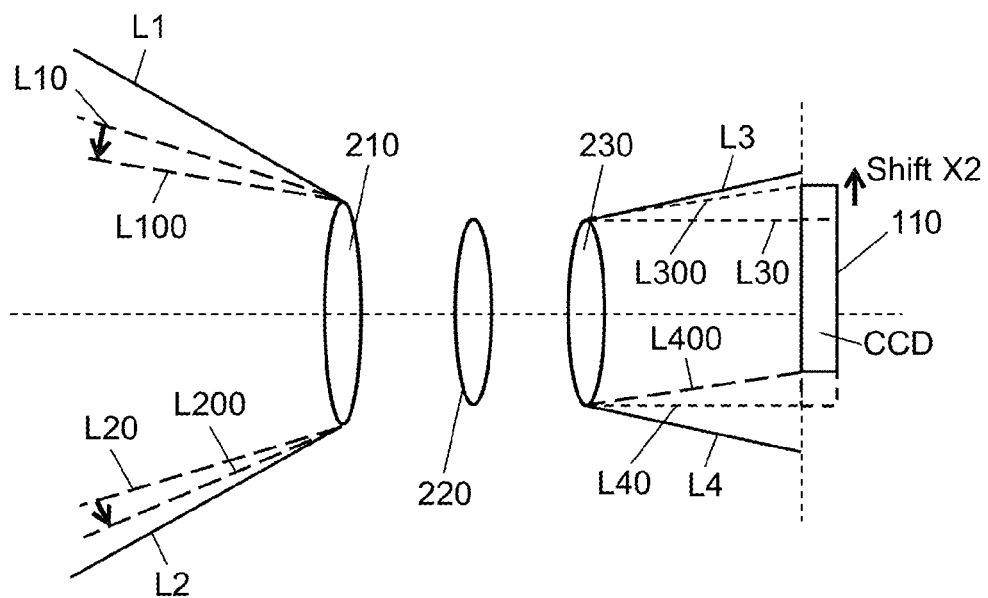
FIG. 8A illustrates the principle of the peripheral brightness characteristics when the CCD of the digital camera of the first embodiment is shifted.
Figure 8B:
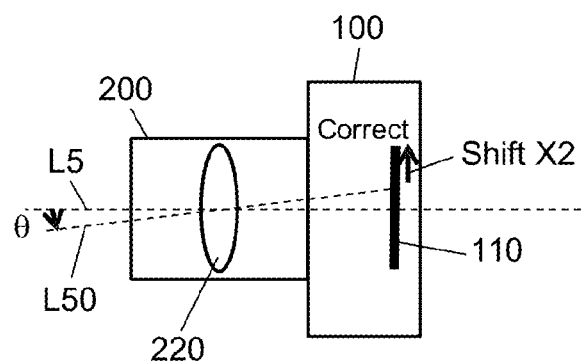
FIG. 8B illustrates the principle of blur correction by shifting the CCD of the digital camera of the first embodiment.

FIG. 8A illustrates the principle of the peripheral brightness characteristics when the CCD is shifted. FIG. 8B illustrates the principle of blur correction by shifting the CCD. FIG. 8B shows digital camera 1 including CCD 110 in camera body 100 and OIS lens 220 in interchangeable lens 200. In FIG. 8B, only the elements needed to explain the point are showen. Assuming that digital camera 1 has rotated by angle θ with respect to optical axis L5 around OIS lens 220 due to shake, optical axis L5 rotates to optical axis L50 by angle θ around OIS lens 220, which is optical axis L5 rotated. In this case, by shifting OIS lens 220 by shift amount X2 according to angle θ, which is an angle by which digital camera 1 has rotated by shake, correction is made so that the coordinate of the intersection point of optical axis L5 on CCD 110 agrees with the coordinate of the intersection point of optical axis L50 on CCD 110. Resultingly, even if digital camera 1 rotates by shake, an object image can be formed on CCD 110 without blur. As an example, assuming that focal length f of interchangeable lens 200 is 150 mm and angle θ by which digital camera 1 has rotated due to shake is 0.3 degree, when axis L5 rotates to optical axis L50 on CCD 110, the position of the formed image deviates by approximately 0.78 mm. This deviation can be corrected by shifting CCD 110 by approximately 0.78 mm.

In FIG. 8A, CCD 110 shifted in the direction vertical to the optical axis provides a blur correction function. First, a description is made of a case where CCD 110 is retained in the center. FIG. 8A shows boundaries L1 and L2 of the range within which an object image can be captured in a case where CCD 110 is retained in the center. The range from L1 to L2 corresponds to the range from L3 to L4 at the side of CCD 110. Meanwhile, FIG. 8A shows boundaries L30 and L40 of the range within which an object image can be captured by CCD 110. The range from L30 to L40 corresponds to the range from L10 to L20 at the side of an object (the left side of zoom lens 210).

Here, as described using FIG. 8B, if digital camera 1 rotates by angle θ around OIS lens 220 due to shake, shifting CCD 110 by shift amount X2 in the direction vertical to the optical axis allows the deviation of the position of an formed image on CCD 110 due to shake to be corrected. Before CCD 110 is shifted, the range from L30 to L40 projected on CCD 110 corresponds to range from L10 to L20 at the side of an object (the left side of zoom lens 210). After CCD 110 is shifted by shift amount X2, the range from L300 to L400 projected on CCD 110 corresponds to range from L100 to L200 at the side of an object (the left side of zoom lens 210). The range from L100 to L200 is the same as that of the blur correction by shifting OIS lens 220 described before. In other words, assuming a rotation angle due to shake of digital camera 1 is θ, the view angle at the side of an object is the same.

In the same way, as a result that boundary L10 of the range at the side of an object (the left side of zoom lens 210) moves to boundary L100, boundary L10 moves away from boundary L1 of the range within which an object can be captured, and thus the amount of light beams at boundary L100 projected on the side of CCD 110 slightly increases. Meanwhile, as a result that boundary L20 of the range at the side of an object (the left side of zoom lens 210) moves to boundary L200, boundary L20 moves closer to boundary L2 of the range within which an object can be captured, and thus the amount of light beams at boundary L200 projected on the side of CCD 110 slightly decreases. After CCD 110 is shifted by shift amount X2, boundary L300 of the range projected on CCD 110 moves closer to boundary L3 of light beams corresponding to the outer shape of the effective image circle, and thus the amount of light beams at boundary L300 projected on the side of CCD 110 further decreases. That is, the amount of light beams further decreases due to a decrease of the amount of light beams entering interchangeable lens 200 due to boundary L200 shifted and due to a decrease of the amount of light beams at boundary L300 corresponding to boundary L200. Meanwhile, after CCD 110 is shifted by shift amount X2, boundary L400 of the range projected on CCD 110 moves away from boundary L4 corresponding to the outer shape of the effective image circle, and thus the amount of light beams at boundary L400 projected on the side of CCD 110 further decreases. That is, the amount of light beams further increases due to an increase of the amount of light beams entering interchangeable lens 200 due to boundary L100 shifted and due to an increase of the amount of light beams at boundary L400 corresponding to boundary L100.

Hence, in a region where the peripheral brightness decreases by shifting the OIS lens or CCD for blur correction, the peripheral brightness decreases to a larger degree by shifting the CCD than the OIS lens. Meanwhile, in a region where the peripheral brightness increases by shifting the OIS lens or CCD for blur correction, the peripheral brightness increases to a larger degree by shifting the CCD than the OIS lens.

2-3-3. Correction of Peripheral Brightness Characteristics by OIS Lens Shift

Figure 9A:
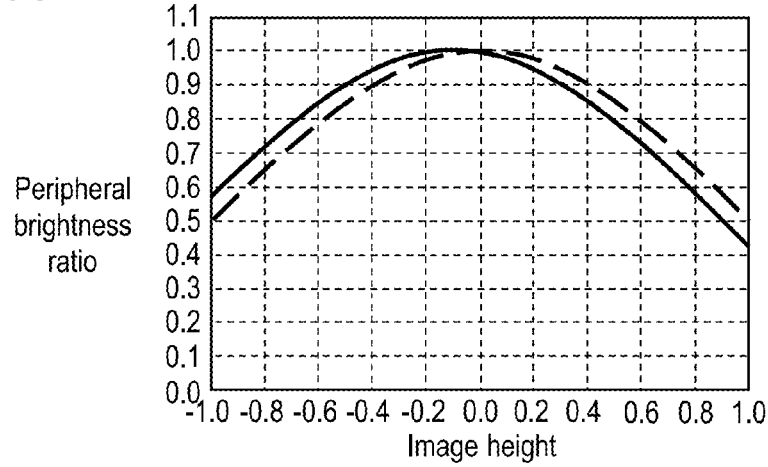
FIG. 9A is a characteristic graph of peripheral brightness after the OIS lens is shifted in the digital camera of the first embodiment.
Figure 9B:
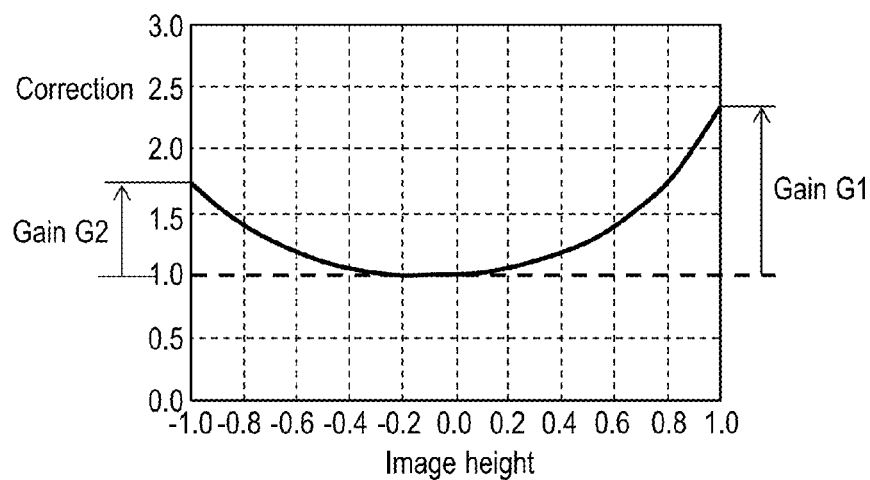
FIG. 9B is a characteristic graph of correction gain for peripheral brightness after the OIS lens is shifted in the digital camera of the first embodiment.
Figure 9C:
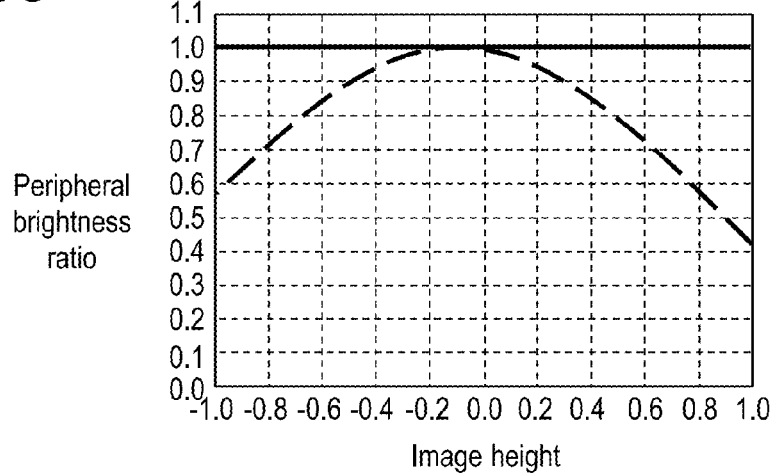
FIG. 9C is a characteristic graph of corrected peripheral brightness after the OIS lens is shifted in the digital camera of the first embodiment.

A specific example is described of correcting changes of the peripheral brightness characteristics caused by shifting the OIS lens, using FIG. 9. FIG. 9A is a characteristic graph of peripheral brightness after the OIS lens is shifted. FIG. 9B is a characteristic graph of correction gain for peripheral brightness (after the OIS lens is shifted). FIG. 9C is a characteristic graph of corrected peripheral brightness (after the OIS lens is shifted).

In FIG. 9A, each height of each corner of an image on CCD 110 is represented by −1.0 and 1 with the height of the center of the image being 0, and the peripheral brightness ratio corresponding to the image height. The broken line is a graph indicating the characteristics of peripheral brightness before the OIS lens is shifted. The solid line is a graph indicating the characteristics of peripheral brightness after the OIS lens is shifted, namely after the OIS lens is shifted by shift amount X1 in the direction vertical to the optical axis. These graphs show circumstances where the peripheral brightness slightly decreases at an image height of 1.0, and slightly increases at an image height of −1.0, by shifting the OIS lens.

FIG. 9B is a characteristic graph of gain for correcting peripheral brightness according to the characteristics of peripheral brightness reduction shown in FIG. 9A. The graph here shows an example where the peripheral brightness is corrected after the OIS lens is shifted, and thus corresponds to the graph indicated by the solid line of FIG. 9A. The peripheral brightness is corrected by increasing the gain for image data input to camera controller 140 through CCD 110 and ADC 111 in camera controller 140 in FIG. 1, according to the image height and correction gain. FIG. 9C shows an example where the peripheral brightness ratio can be corrected to 1.0 independently of an image height by multiplying the characteristics of peripheral brightness reduction indicated by the solid line in FIG. 9A; by the characteristics of peripheral brightness correction gain of FIG. 9B, for each image height. In FIG. 9C, the characteristic graph (same as the characteristic graph of FIG. 9A) indicated by the broken line changes to the characteristic graph after peripheral brightness correction indicated by the solid line by correction.

In FIG. 9B, the gain at an image height of 1.0 is defined as G1; the gain at an image height of −1.0 is defined as G2. The gains G1 and G2 will be used in the later description of correction of the peripheral brightness characteristics by shifting a CCD.

2-3-4. Correction of Peripheral Brightness Characteristics by CCD Shift

Figure 10A:
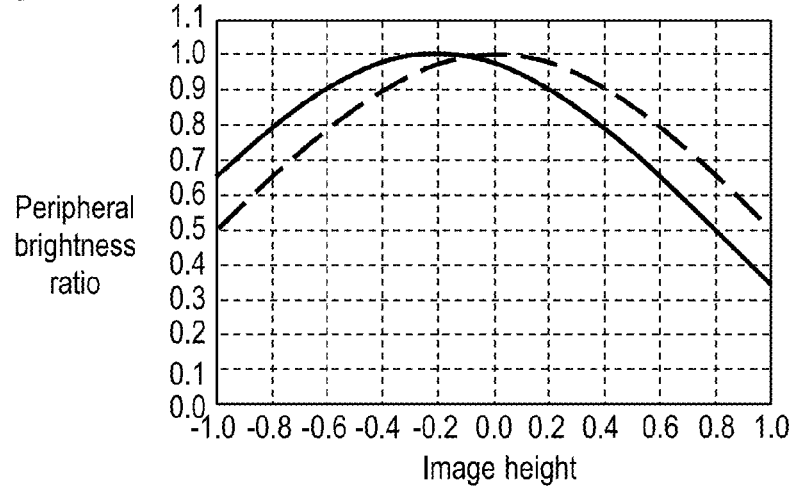
FIG. 10A is a characteristic graph of peripheral brightness after the CCD is shifted in the digital camera of the first embodiment.
Figure 10B:
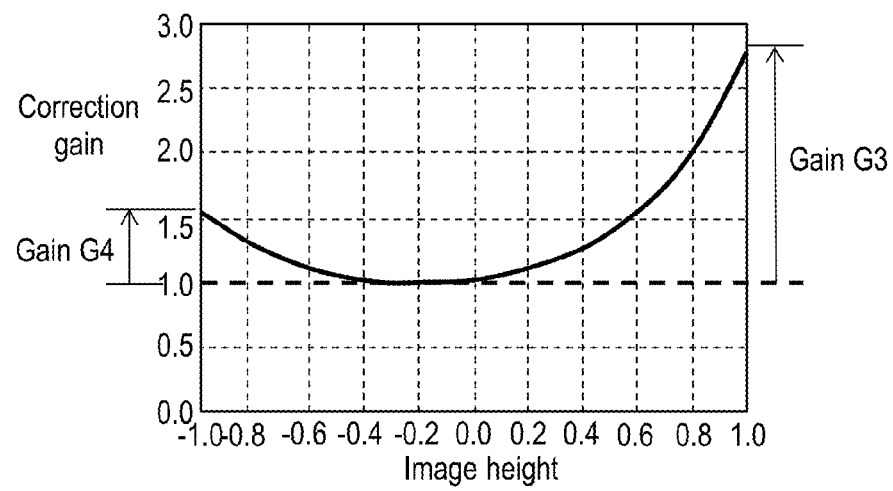
FIG. 10B is a characteristic graph of correction gain for peripheral brightness after the CCD is shifted in the digital camera of the first embodiment.
Figure 10C:
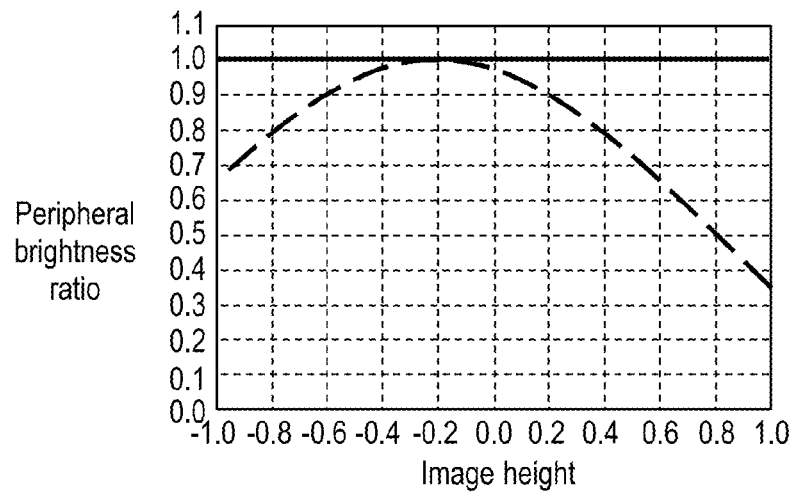
FIG. 10C is a characteristic graph of corrected peripheral brightness after the CCD is shifted in the digital camera of the first embodiment.

A specific example is described of correcting changes of peripheral brightness characteristics caused by shifting an OIS lens, using FIG. 10. FIG. 10A is a characteristic graph of peripheral brightness after the CCD is shifted. FIG. 10B is a characteristic graph of correction gain for peripheral brightness (after the CCD is shifted). FIG. 10C is a characteristic graph of corrected peripheral brightness (after the CCD is shifted).

FIG. 10A shows the peripheral brightness ratio corresponding to the image height, where each height of each corner of an image on CCD 110 is represented by −1.0 and 1 with the height of the center of the image being 0. The broken line is a graph indicating the characteristics of peripheral brightness before the CCD is shifted. The solid line is a graph indicating the characteristics of peripheral brightness after the CCD is shifted, namely after the CCD is shifted by shift amount X2 in the direction vertical to the optical axis. As described before, these graphs show circumstances where the peripheral brightness decreases at an image height of 1.0, and slightly increases at an image height of −1.0, by shifting the CCD. Especially compared with FIG. 9A, FIG. 10A shows circumstances where the peripheral brightness decreases to a larger degree after the CCD is shifted than after the OIS lens is shifted, with respect to the peripheral brightness at an image height of 1.0 before the CCD is shifted or before the OIS lens is shifted. Also, compared with FIG. 9A, FIG. 10A shows circumstances where the peripheral brightness increases to a larger degree after the CCD is shifted than after the OIS lens is shifted, with respect to the peripheral brightness at an image height of −1.0 before the CCD is shifted or before the OIS lens is shifted.

FIG. 10B is a characteristic graph of gain for correcting peripheral brightness according to the characteristics of peripheral brightness reduction shown in FIG. 10A. FIG. 10B shows an example where the peripheral brightness is corrected after the CCD is shifted, and thus corresponds to the graph indicated by the solid line of FIG. 10A. The peripheral brightness is corrected by increasing the gain for image data input to camera controller 140 through CCD 110 and ADC 111 in camera controller 140 in FIG. 1, according to the image height and correction gain. FIG. 10C shows an example where the peripheral brightness ratio can be corrected to 1.0 independently of an image height by multiplying the characteristics of peripheral brightness reduction indicated by the solid line in FIG. 10A; by the characteristics of peripheral brightness correction gain of FIG. 10B, for each image height. In FIG. 10C, the characteristic graph (same as the characteristic graph indicated by the solid line of FIG. 10A) indicated by the broken line changes to the characteristic graph after peripheral brightness correction indicated by the solid line by correction.

In FIG. 10B, the gain at an image height of 1.0 is defined as G3; the gain at an image height of −1.0 is defined as G4. Magnitude is compared between gains G1 and G2, which are defined in the description of correction of peripheral brightness characteristics by OIS lens shift, and gains G3 and G4, which are defined in FIG. 10B. At an image height of 1.0, G3>G1 is satisfied; at an image height of −1.0, G4<G2 is satisfied. Thus, for rotation angle θ due to shake, at an image height of 1.0, the peripheral brightness reduces to a larger degree after the CCD is shifted than after the OIS lens is shifted. Hence, the peripheral brightness correction gain is set to a larger value when the CCD is shifted than when the OIS lens is shifted. Meanwhile, at an image height of −1.0 for rotation angle θ due to shake, the peripheral brightness reduces to a smaller degree after the CCD is shifted than after the OIS lens is shifted. Hence, the peripheral brightness correction gain is set to a smaller degree when the CCD is shifted than when the OIS lens is shifted.

3. Summary

This embodiment provides a specific example where the peripheral brightness reduction is appropriately corrected at one corner and the other corner of the CCD to prevent captured images from degrading, for producing favorable captured images.

This embodiment relates to digital camera 1 that performs a blur correction function for reducing the influence of camera shake on a captured image during photographing by shifting OIS lens 220 and CCD 110. The peripheral brightness on CCD 110 in digital camera 1 reduces by shifting OIS lens 220 for a certain amount of shake compared to a case where blur correction is not performed. Further, the peripheral brightness on CCD 110 reduces to a larger degree when CCD 110 is shifted than when OIS lens 220 is shifted, for the same shake amount. Hence, in this case, the peripheral brightness correction is performed to a larger degree by CCD shift than by OIS lens shift, which eliminates degrading of captured images due to shake and peripheral brightness reduction.

Meanwhile, the peripheral brightness on CCD 110 can increase by shifting OIS lens 220 for a certain amount of shake compared to a case where blur correction is not performed; the peripheral brightness on CCD 110 increases to a larger degree by shifting CCD 110 for the same amount of shake. In this case, the peripheral brightness correction is performed to a smaller degree by CCD shift than by OIS lens shift, which eliminates degrading of captured images due to shake and peripheral brightness reduction.

Especially combining both of them reduces the gap of peripheral brightness reduction between the right and left in a captured image to provide images with a higher grade.

More specifically, digital camera 1 changes the correction level of the peripheral brightness when correcting blurring is switched from by OIS lens shift to by CCD shift, or vice versa. This eliminates degrading of captured images due to shake and peripheral brightness reduction.

Second Exemplary Embodiment

1. Configuration

A description is made of another example of the configuration of a digital camera with blur correction. The configuration of digital camera 1 according to the embodiment is the same as that of the first embodiment except for the OIS processing unit and the BIS processing unit.

Figure 11:
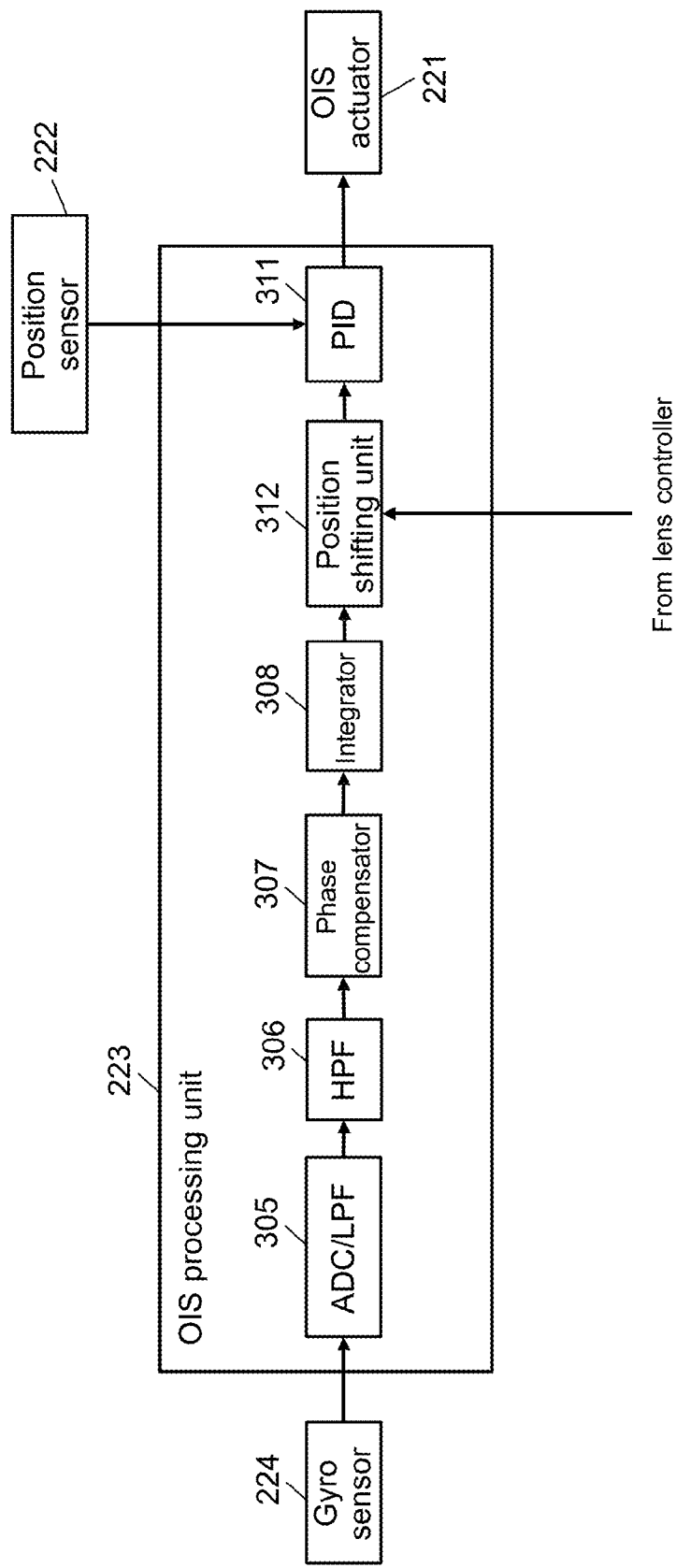
FIG. 11 is a block diagram illustrating the configuration of the OIS processing unit in a digital camera according to the second exemplary embodiment.

FIG. 11 is a block diagram illustrating the configuration of OIS processing unit 223 in digital camera 1 according to the embodiment. OIS processing unit 223 of the embodiment includes ADC/LPF 305, HPF 306, phase compensator 307, integrator 308, and PID control unit 311. These components function in the same way as those shown in the first embodiment. OIS processing unit 223 of the embodiment further includes position shifting unit 312 that shifts the central position of the movement of OIS lens 220 following directions from lens controller 240. Thus, position shifting unit 312 reflects the central position of the movement of OIS lens 220 in output (a shake detection signal) from integrator 308. Hereinafter, a signal output from position shifting unit 312 is referred to as an OIS control signal.

Figure 12:
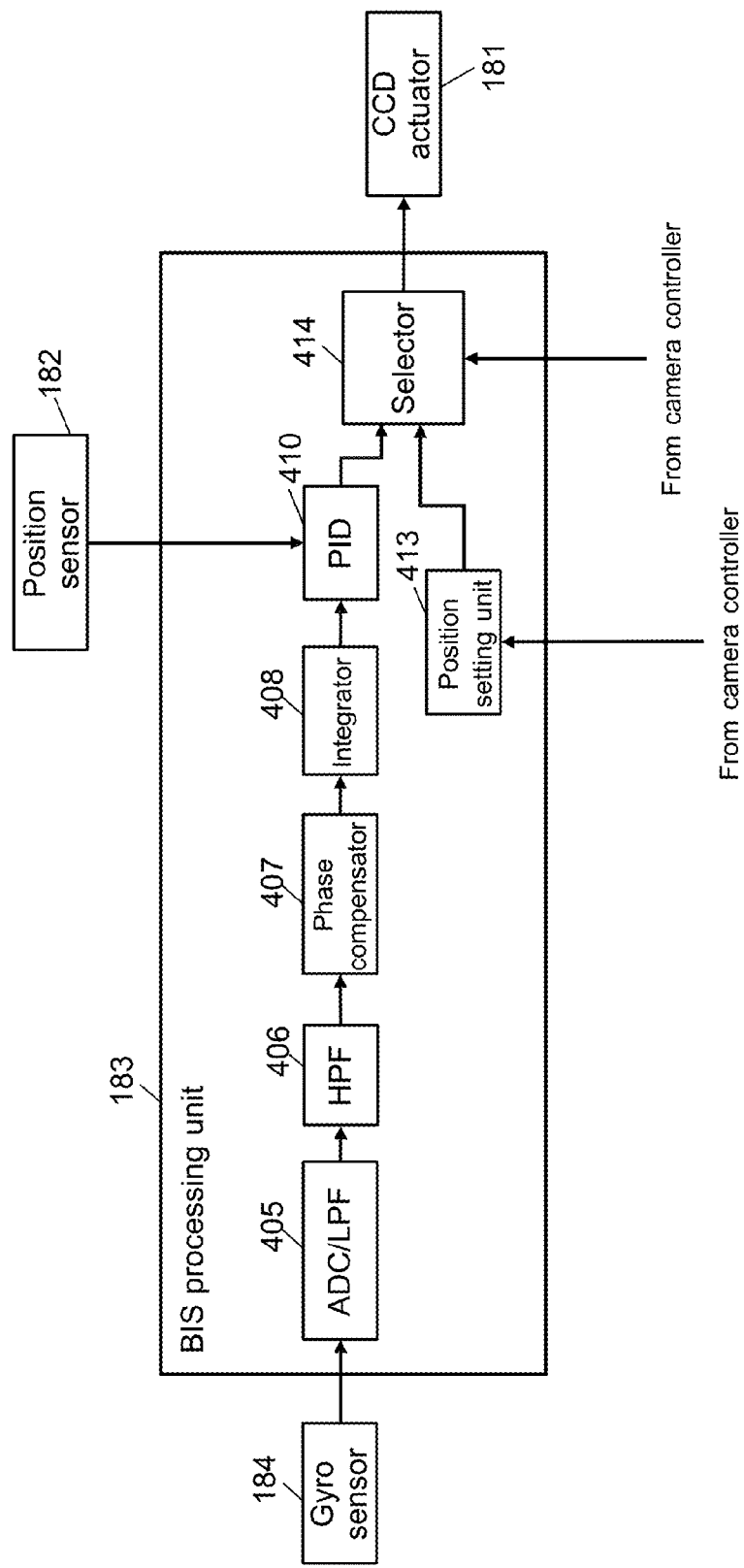
FIG. 12 is a block diagram illustrating the configuration of the BIS processing unit in the digital camera according to the second embodiment.

FIG. 12 is a block diagram illustrating the configuration of BIS processing unit 183 in digital camera 1 of the embodiment. BIS processing unit 183 of the embodiment includes ADC/LPF 405, HPF 406, phase compensator 407, integrator 408, and PID control unit 410. These components function in the same way as those shown in the first embodiment. BIS processing unit 183 of the embodiment further includes position setting unit 413 and selector 414. Position setting unit 413 outputs a signal for setting the position of CCD 110. Selector 414 outputs selectively either output from PID control unit 410 or output from position setting unit 413. Position setting unit 413 and selector 414 are controlled by camera controller 140. Hereinafter, output from position setting unit 413 is referred to as a BIS control signal.

In this embodiment, only the OIS function at the side of interchangeable lens 200 is used for correcting blur. Accordingly, selector 414 of BIS processing unit 183 is selecting output from position setting unit 413. Here, if the interchangeable lens is not provided with a blur correction function, selector 414 selects output from PID control unit 410 to perform a blur correction function at the side of camera body 100.

2. Operation
2-1. Blur Correction Processing

In the blur correction processing of this embodiment, OIS lens 220 is centered (shifted to the central position) especially at the beginning of an exposure period for correcting blur during the exposure period. Centering OIS lens 220 allows an effective use of the range of correction by OIS lens 220 during the exposure period.

Figure 13:
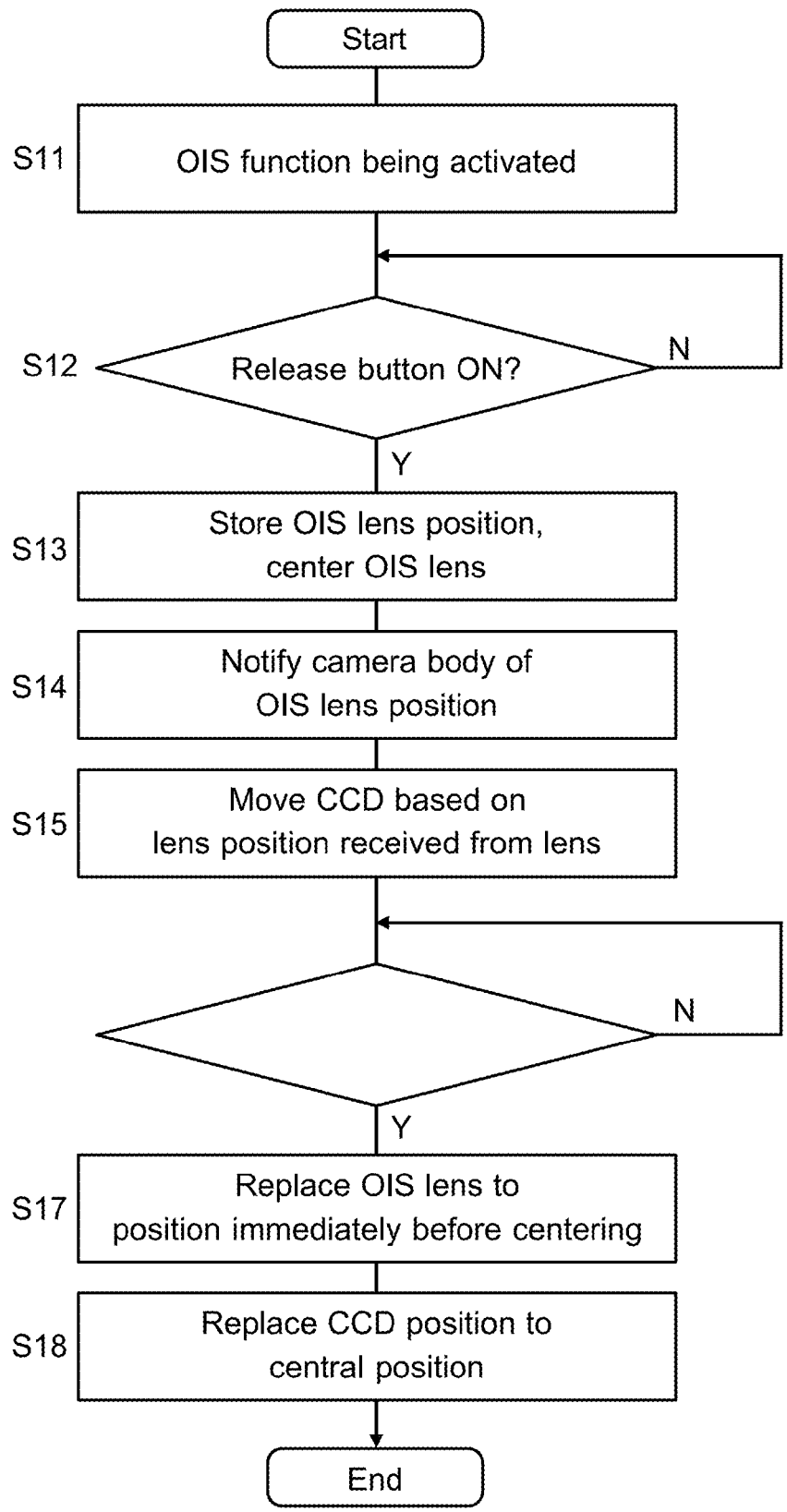
FIG. 13 is a flowchart illustrating the blur correction processing in the digital camera according to the second embodiment.

FIG. 13 is a flowchart illustrating the blur correction processing in digital camera 1 of the embodiment. As described above, digital camera 1 activates only the OIS function in an unexposed state (displaying a live view) (S11). When release button 130 is pressed by a user (Yes in S12), camera controller 140 transmits a release signal indicating that release button 130 has been pressed, to lens controller 240 through body mount 150 and lens mount 250. When receiving the release signal, lens controller 240 stores information indicating the current position of OIS lens 220, in DRAM 241, and controls OIS processing unit 223 to center (move to the central position) the position of OIS lens 220 (S13). At this moment, an OIS control signal is generated that causes position shifting unit 312 to shift the central position of the movement of OIS lens 220. Further, lens controller 240 transmits positional information of OIS lens 220 stored in DRAM 241, to camera body 100 through lens mount 250 and body mount 150 (S14).

Camera controller 140 of camera body 100, when receiving positional information of OIS lens 220 from interchangeable lens 200, converts the information to the amount of movement of CCD 110 based on the positional information received (i.e., the position of OIS lens 220 immediately before centering), to determine a target movement position of CCD 110. Camera controller 140 controls BIS processing unit 183 to move CCD 110 to the target movement position (S15). At this moment, a BIS control signal is generated that causes position setting unit 413 to move CCD 110 to the target movement position. During exposure after then, BIS processing unit 183 holds the position of CCD 110 to the resulting position (S16).

When the exposure ends, camera controller 140 notifies lens controller 240 of the end of the exposure. Lens controller 240 reads the positional information of OIS lens 220 stored in DRAM 241 and controls OIS processing unit 223 to move OIS lens 220 to the position indicated in the positional information (S17). At this moment, a BIS control signal is generated that causes position setting unit 413 to move CCD 110 to the position indicated in the positional information. BIS processing unit 183 replaces CCD 110 to a given central position for CCD 110 (S18). At this moment, a BIS control signal is generated that causes position setting unit 413 to move CCD 110 to the given central position.

Figure 14:
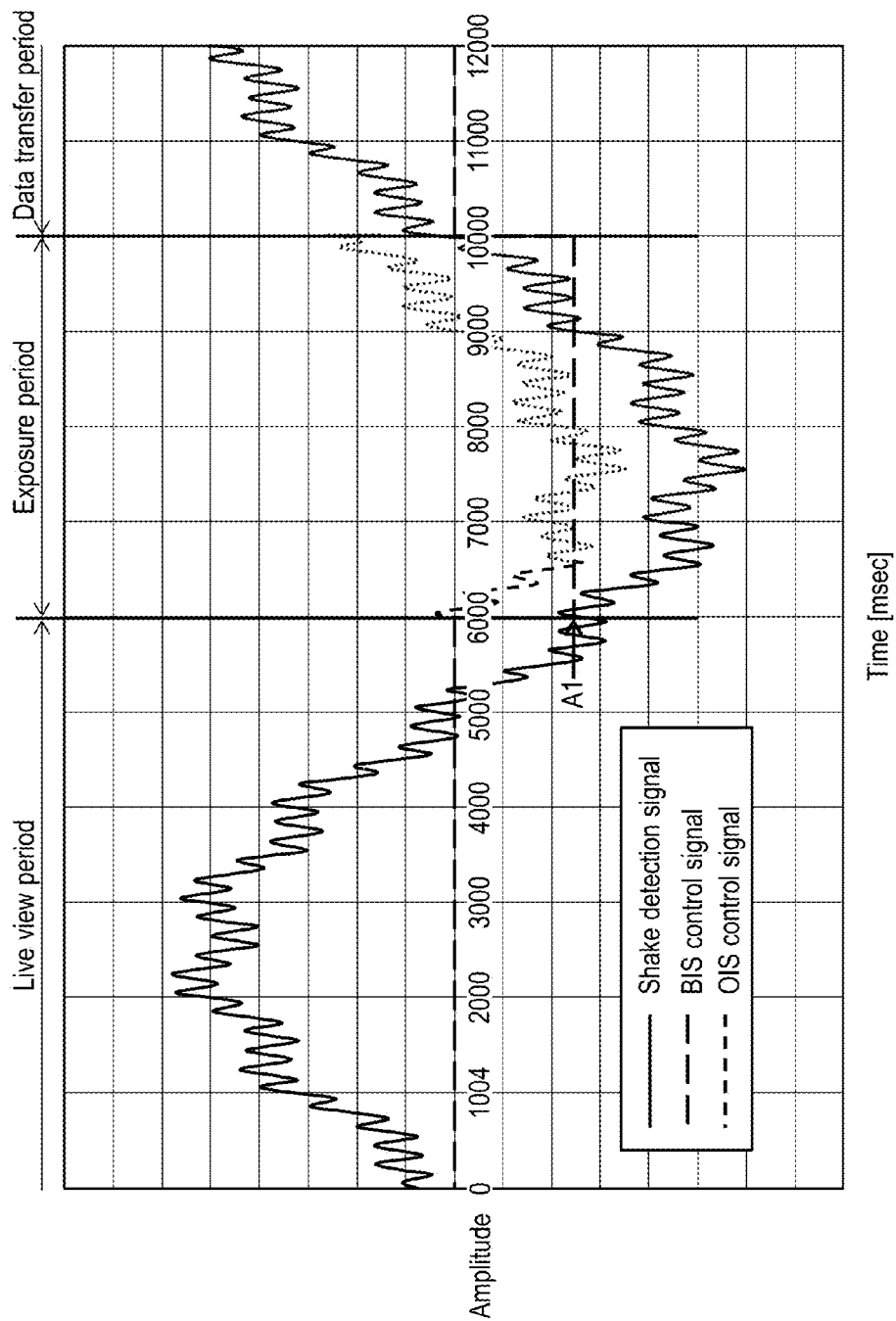
FIG. 14 illustrates changes of a shake detection signal, a BIS control signal, and an OIS control signal in the blur correction processing of the second embodiment.

FIG. 14 illustrates an example of changes of a shake detection signal (output from integrator 308), an OIS control signal (output from position shifting unit 312), and a BIS control signal (output from position setting unit 413) in the above-described blur correction processing. As shown in the figure, control is performed to shift OIS lens 220 to the central position and drive OIS lens 220 with the central position being in the center during an exposure period. Meanwhile, CCD 110 is shifted to a position corresponding to the position of OIS lens 220 immediately before centering and is fixed to there. During a period other than the exposure period, OIS lens 220 is controlled to be driven with its proper central position in the center, and CCD 110 is as well fixed to its proper central position.

As described above, digital camera 1 of the embodiment centers OIS lens 220 and shifts the position of CCD 110 by a distance proportionate to movement of centering OIS lens 220 at the beginning of the exposure period. Then, during the exposure period, the OIS function is executed with CCD 110 fixed to the position. When the exposure ends, OIS lens 220 is replaced to the position immediately before centering and CCD 110 is replaced to a given central position.

Thus centering OIS lens 220 at the beginning of exposure allows an effective use of the range of correction by OIS lens 220 during the exposure period. Compensating the distance caused by centering OIS lens 220 with movement of CCD 110 prevents a displacement of the view angle caused by centering. This allows a user to photograph at the view angle same as that viewed before exposure, and digital camera 1 can effectively use the blur correction.

2-2. Peripheral Brightness Correction in Blur Correction System

The peripheral brightness correction described in the first embodiment is applied to digital camera 1 of this embodiment. In the example of FIG. 14 described in this embodiment, the view angle is put in place at timing T0, and OIS lens 220 is shifted to the center for enhancing the effect of correcting camera blur. At the same time, the displacement of the view angle caused by centering OIS lens 220 is compensated by shifting CCD 110. Here, if the amplitude corresponding to the shake angle of OIS lens 220 is assumed to be A1 immediately before T0, then the amplitude corresponding to the shake angle of CCD 110 is also A1 immediately after T0. In this case, the peripheral brightness is corrected by shifting OIS lens 220 immediately before T0 and by shifting CCD 110 immediately after T0 in the same way as described in the first embodiment. Hence, before and after T0 at an image height of 1.0, the peripheral brightness reduces to a larger degree by CCD shift than by OIS lens shift, and thus camera controller 140 sets the peripheral brightness correction gain to a large degree. Meanwhile, at an image height of −1.0, the peripheral brightness reduces to a smaller degree after CCD shift than after OIS lens shift, and thus camera controller 140 sets the peripheral brightness correction gain to a small degree.

3. Summary

In this embodiment, digital camera 1 puts the view angle in place at timing T0, and shifts OIS lens 220 to the center for enhancing the effect of correcting blurring. At the same time, the displacement of the view angle caused by centering OIS lens 220 is compensated by shifting CCD 110. In this case, digital camera 1 changes the correction level of the peripheral brightness caused by shifting OIS lens 220 immediately before T0, and the correction level of the peripheral brightness caused by shifting CCD 110 immediately after T0. This provides a required level of image grade immediately before and after T0.

Other Exemplary Embodiments

The scope of the design concept in the above-described embodiments is not limited to them. Other different embodiments may be considered. Hereinafter, a description is made of other embodiments to which the scope of the design concept can be applied.

In the first and second embodiments, the description is made with an example where an interchangeable lens and a camera body are used; a lens integrated camera may be used.

In the first and second embodiments, the functions described above may be achieved by a software program and a hardware device (e.g., an imaging apparatus, a smart phone) in a coordinated fashion, where the program is loaded to the apparatus as a computer from a storage media. Alternatively, the program attaining the above functions may be downloaded from a server to the apparatus (e.g., an imaging apparatus, a smart phone) for installation. Further, the above functions may be achieved by mounting a control unit formed of electronic circuits (e.g., a semiconductor integrated circuit).

Hereinbefore, the description is made of some embodiments for exemplification of the technologies in the disclosure. For this purpose, detailed descriptions and accompanying drawings are disclosed. Accordingly, some components described in the detailed descriptions and accompanying drawings may include what is not essential for solving problems. Hence, the fact that such inessential components are included in the detailed descriptions and accompanying drawings does not mean that such inessential components are immediately acknowledged as essential.

The above-described embodiments are for exemplification of the technologies in the disclosure. Hence, the embodiments may undergo various kinds of change, substitution, addition, and/or omission within the scope of the claims and their equivalent technology.

The application is based on Japanese Patent Application (No. 2015-044147) filed on Mar. 6, 2015, the contents of which are incorporated herein by reference.

What is claimed is:

1. An imaging apparatus comprising:
    an optical system having a plurality of lenses including a correcting lens for correcting image blur;
    a lens actuator moving the correcting lens in a plane vertical to an optical axis to correct image blur;
    an imaging device capturing an object image formed by the optical system;
    a device actuator moving the imaging device in a plane vertical to the optical axis to correct image blur; and
    a control unit correcting the image captured by the imaging device,
    wherein the control unit changes a correction level of peripheral brightness of the image captured by the imaging device when correcting image blur is switched between by the lens actuator and by the device actuator.

2. The imaging apparatus of claim 1, wherein the control unit increases the correction level of peripheral brightness at one end of the imaging device and decreases the correction level of peripheral brightness at an other end, opposite to the one end of the imaging device, when correcting blurring is switched between by the lens actuator and by the device actuator.

3. The imaging apparatus of claim 1, further comprising:
    an interchangeable lens including the optical system and the lens actuator, and
    a camera body including the imaging device, the device actuator, and the control unit,
    wherein the interchangeable lens is attachable to and detachable from the camera body.

4. An imaging apparatus comprising:
    an optical system having a plurality of lenses including a correcting lens for correcting image blur;
    a lens actuator moving the correcting lens in a plane vertical to an optical axis to correct image blur;
    an imaging device capturing an object image formed by the optical system;
    an device actuator moving the imaging device in a plane vertical to the optical axis to correct image blur;
    a control unit correcting the image captured by the imaging device; and
    a display unit displaying the image corrected by the control unit,
    wherein the control unit changes a correction level of peripheral brightness of the image captured by the imaging device when a state of the imaging apparatus changes from a live-view state to an exposure state.

5. The imaging apparatus of claim 4, wherein the control unit increases the correction level of peripheral brightness at one end of the imaging device and decreases the correction level of peripheral brightness at an other end, opposite to the one end of the imaging device, when the state of the imaging apparatus changes from the live-view state to the exposure state.

6. The imaging apparatus of claim 4, further comprising:
    an interchangeable lens including the optical system and the lens actuator; and
    a camera body including the imaging device, the device actuator, and the control unit,
    wherein the interchangeable lens is attachable to and detachable from the camera body.

7. An imaging method comprising:
    a step of capturing an object image formed by an optical system including a correcting lens, with an imaging device;
    a first image blur correcting step of moving the correcting lens in a plane vertical to an optical axis to correct image blur;
    a second image blur correcting step of moving the imaging device in a plane vertical to the optical axis to correct image blur; and
    a step of correcting the image captured by the imaging device,
    wherein the step of correcting the image changes a correction level of peripheral brightness of the image when image blur correcting is switched between by the first image blur correcting step and by the second image blur correcting step.

* * * * *